US012668243B2

(12) United States Patent
Igari

(10) Patent No.: US 12,668,243 B2
(45) Date of Patent: Jun. 30, 2026

(54) CONTROLLER AND CONTROL METHOD

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 18/695,140

(22) PCT Filed: Sep. 28, 2022

(86) PCT No.: PCT/IB2022/059224
§ 371 (c)(1),
(2) Date: Mar. 25, 2024

(87) PCT Pub. No.: WO2023/053023
PCT Pub. Date: Apr. 6, 2023

(65) Prior Publication Data
US 2025/0162585 A1      May 22, 2025

(30) Foreign Application Priority Data

Sep. 28, 2021    (JP) ................................. 2021-157669

(51) Int. Cl.
*B60W 30/16*        (2020.01)
*B60T 8/26*          (2006.01)
*B60W 10/184*      (2012.01)
(52) U.S. Cl.
CPC ............. *B60W 30/16* (2013.01); *B60T 8/261* (2013.01); *B60W 10/184* (2013.01);
(Continued)
(58) Field of Classification Search
CPC ............... B60W 50/085; B60W 50/10; B60W 50/0098; B60W 30/02; B60W 30/025;
(Continued)

(56) References Cited

U.S. PATENT DOCUMENTS 12,084,030 B2 *    9/2024    Oshida .................. B60T 8/3225
2017/0008500 A1    1/2017    Iwatsuki
(Continued)

FOREIGN PATENT DOCUMENTS

EP      3608180 A1      2/2020
EP      3988408 A1      4/2022
(Continued)

OTHER PUBLICATIONS

International Search Report and Written Opinion for Application No. PCT/IB2022/059224 dated Dec. 16, 2022 (9 pages).

*Primary Examiner* — Erin M Piateski
*Assistant Examiner* — John C Merino
(74) *Attorney, Agent, or Firm* — Michael Best & Friedrich LLP

(57)                ABSTRACT

The present invention provides a controller and a control method capable of improving safety of a lean vehicle.

According to a controller (30) and a control method of the present invention, an execution section of the controller executes an operation that causes the lean vehicle to execute a cruise control based on a positional relationship information that is information about a positional relationship between the lean vehicle and a preceding vehicle preceding the lean vehicle. While the operation is enabled by a rider of the lean vehicle, the execution section changes a ratio between a braking force generated in a front wheel of the lean vehicle and a braking force generated in a rear wheel based on a speed information of the lean vehicle.

10 Claims, 4 Drawing Sheets

(52) U.S. Cl.
    CPC ....... *B60T 2210/32* (2013.01); *B60T 2250/04*
          (2013.01); *B60W 2300/36* (2013.01); *B60W*
          *2520/10* (2013.01); *B60W 2540/10* (2013.01);
          *B60W 2552/15* (2020.02); *B60W 2554/802*
          (2020.02); *B60W 2710/18* (2013.01)

(58) Field of Classification Search
    CPC ......... B60W 40/09; B60W 2050/0075; B60W
          2050/0033; B60W 2710/18; B60W
          2520/10; B60W 2520/105; B60W
          2300/36; B60W 2720/106
    See application file for complete search history.

(56)                    References Cited

U.S. PATENT DOCUMENTS

| | | | |
|---|---|---|---|
| 2019/0210592 A1 | 7/2019 | Wahl et al. | |
| 2021/0188270 A1* | 6/2021 | Horn ........................ | B62J 45/20 |

FOREIGN PATENT DOCUMENTS

| | | |
|---|---|---|
| JP | 2009116882 A | 5/2009 |
| JP | 2017037549 A | 2/2017 |
| JP | 2018114832 A | 7/2018 |
| JP | 2018176831 A | 11/2018 |
| JP | 2019131130 A | 8/2019 |
| JP | 2020015365 A | 1/2020 |
| JP | 2020203654 A | 12/2020 |
| WO | 2020254897 A1 | 12/2020 |

* cited by examiner

[FIG. 1]
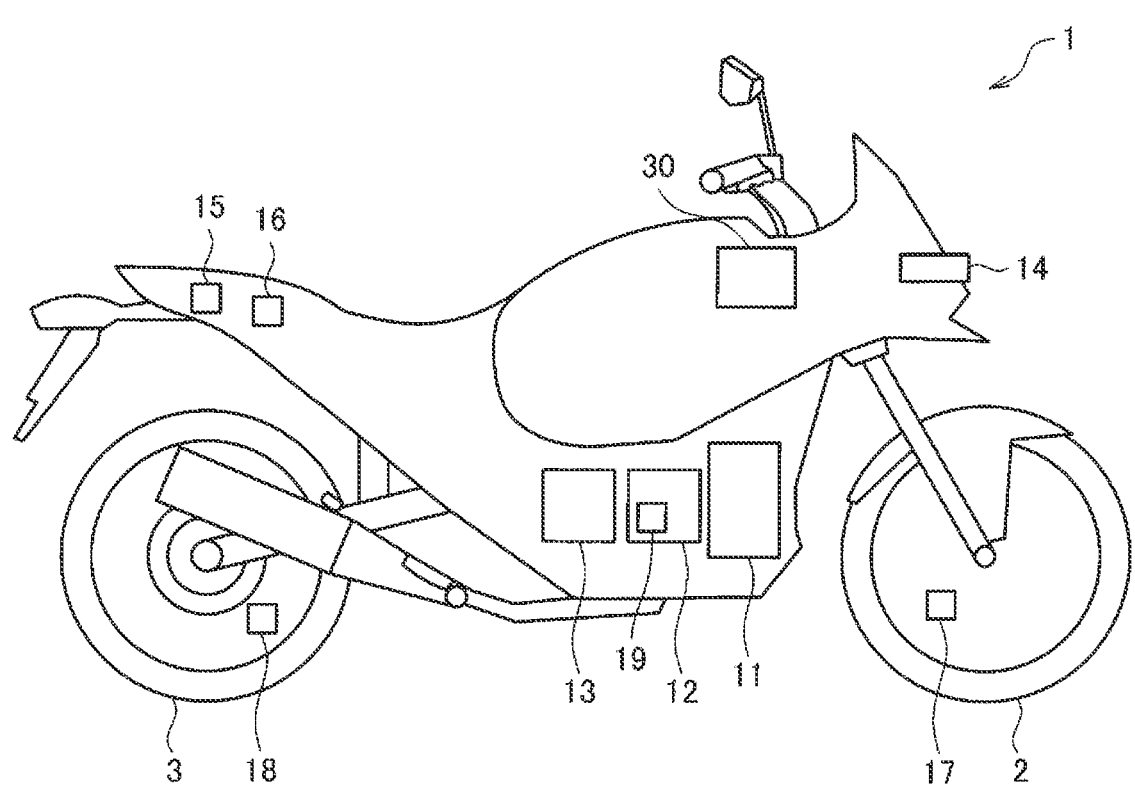

[FIG. 2]
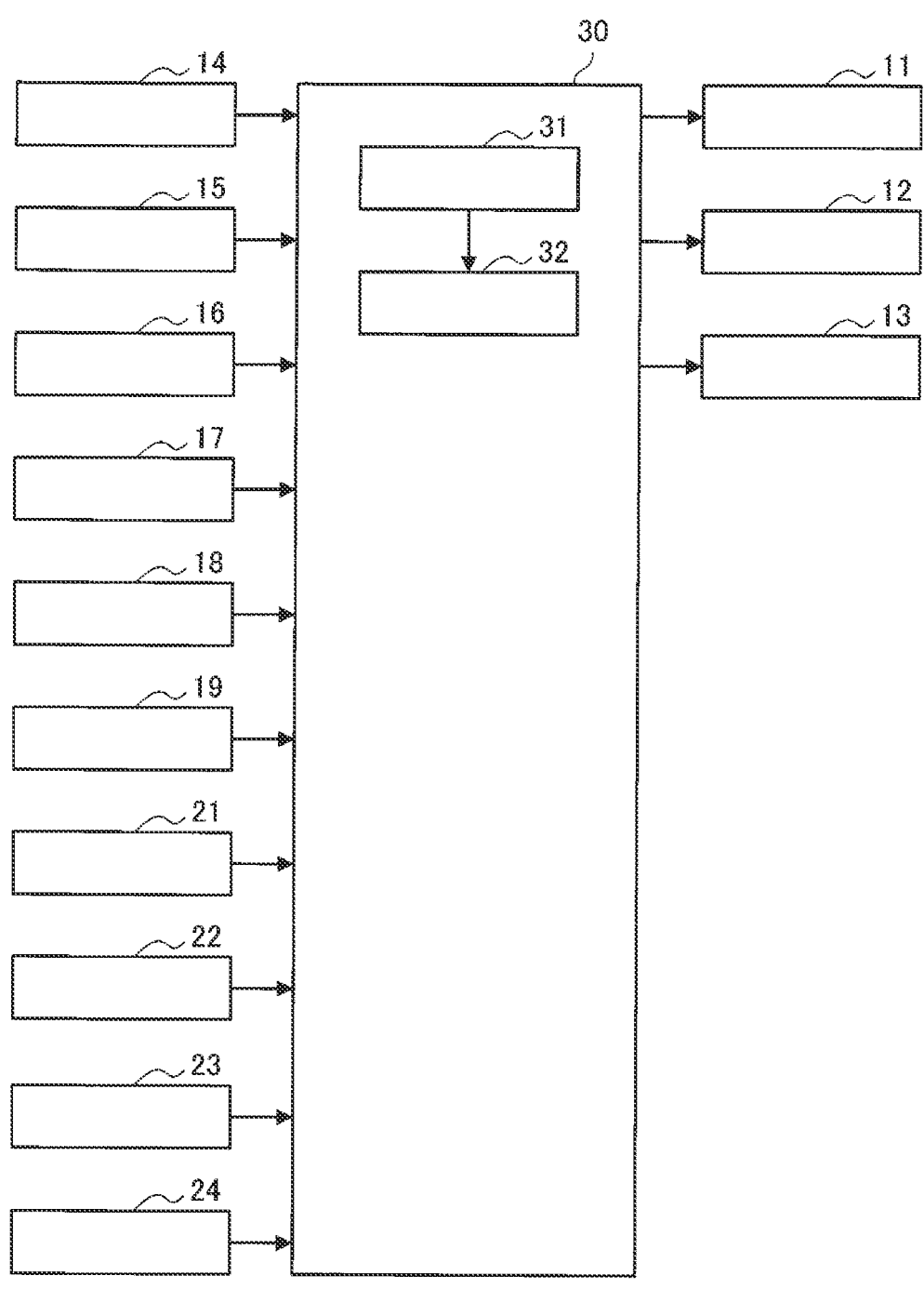

[FIG. 3]
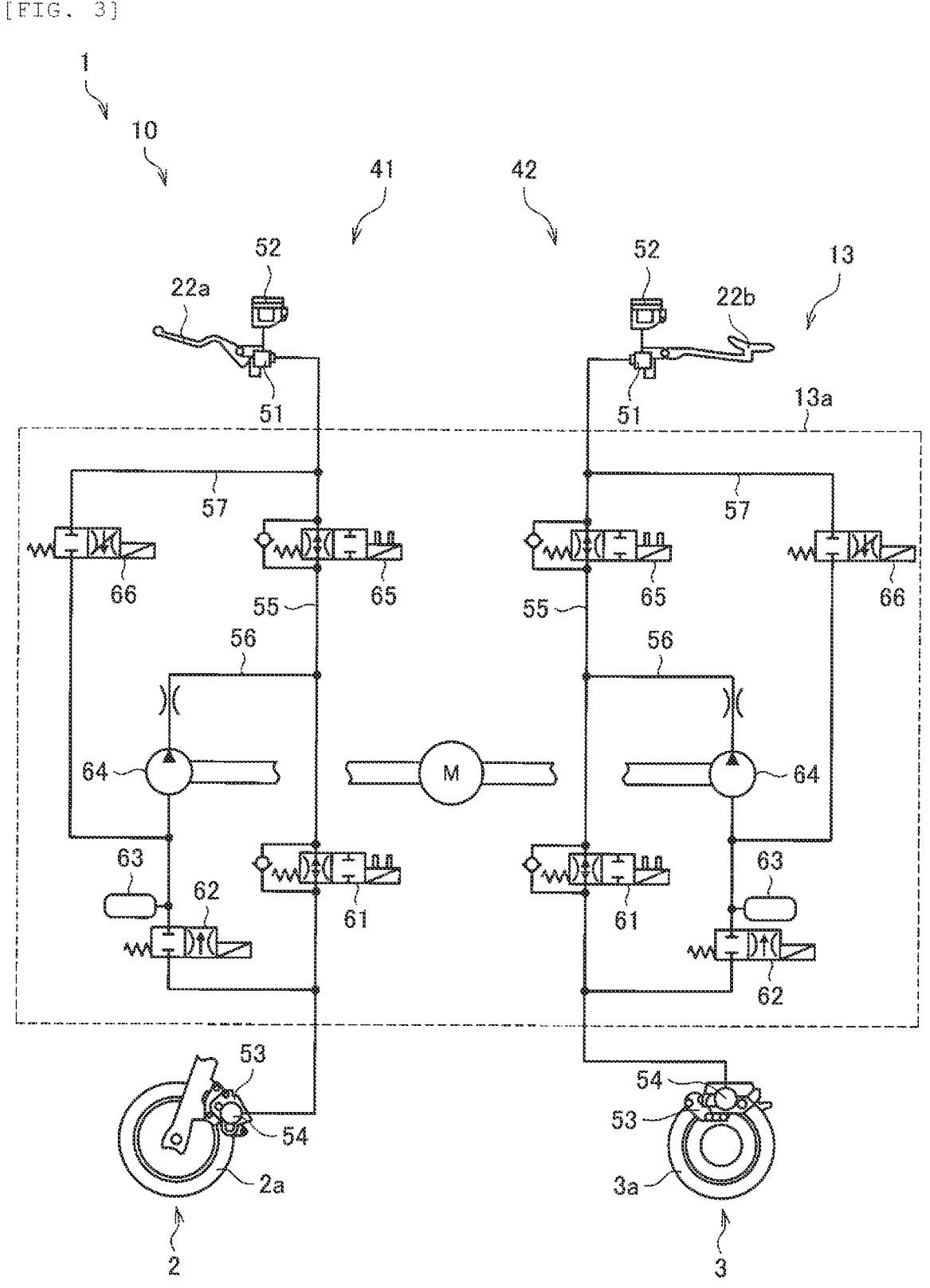

[FIG. 4]
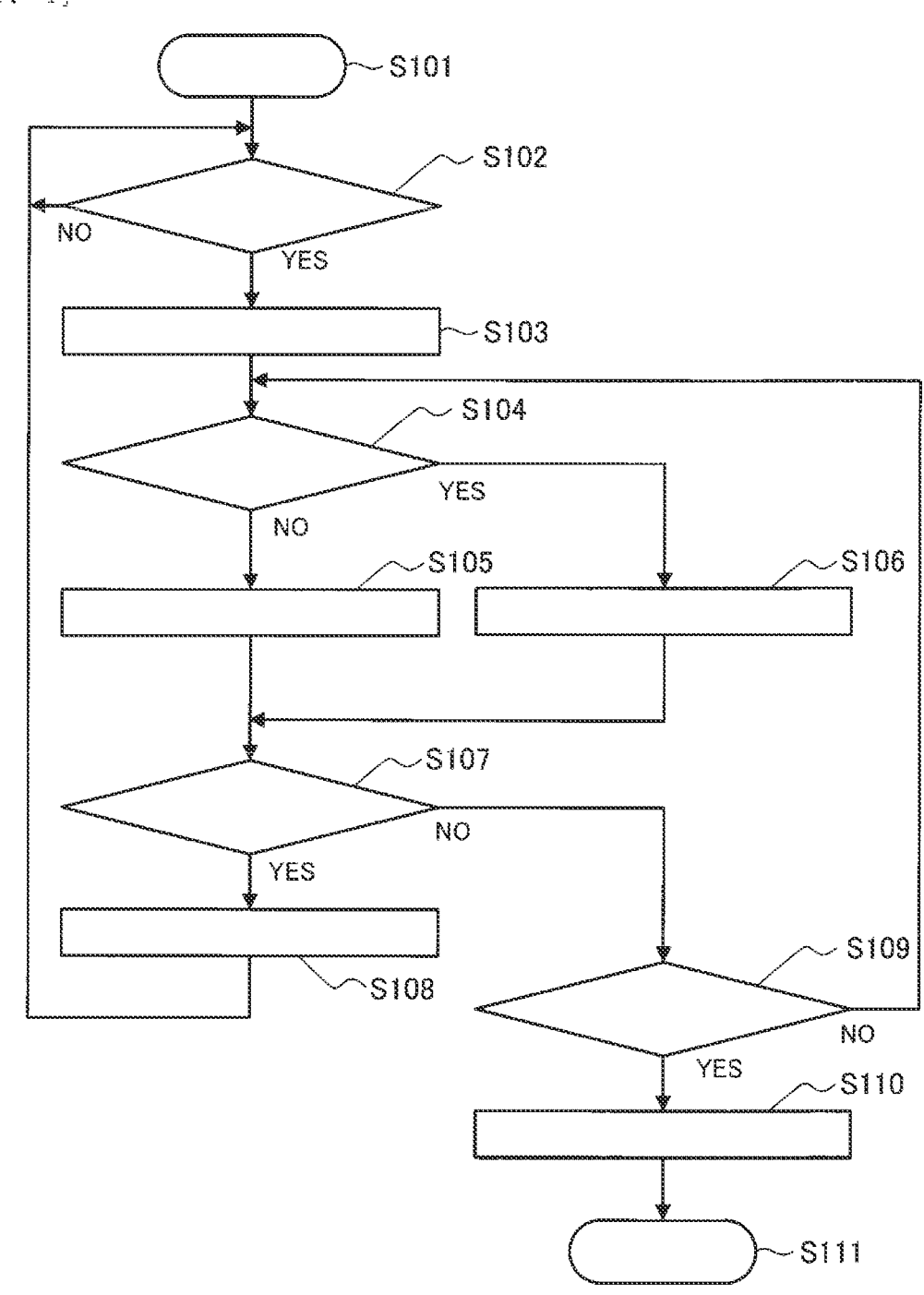

CONTROLLER AND CONTROL METHOD

BACKGROUND

The present disclosure relates to a controller and a control method capable of improving safety of a lean vehicle.

As a conventional technique related to a lean vehicle such as a motorcycle, a technique of assisting with a rider's driving has been available. For example, a driver assistance system is disclosed in JP 2009-116882 A. The driver assistance system warns the rider of the motorcycle that the motorcycle inappropriately approaches an obstacle based on information detected by a sensor that detects the obstacle present in a travel direction or substantially in the travel direction.

SUMMARY

By the way, as the technique of assisting with driving, cruise control for automatically controlling a vehicle speed has been available. In particular, as the cruise control, there is control that is executed based on a positional relationship information between an own vehicle and a preceding vehicle so as to secure an inter-vehicular distance between the own vehicle and the preceding vehicle as a safe distance. Here, it is considered to apply such cruise control to the lean vehicle. However, a posture of the lean vehicle is more likely to become unstable than a posture of an automobile having four wheels. For example, when a speed of the lean vehicle is reduced in a deceleration process of the lean vehicle, the posture of the lean vehicle is easily changed in a pitch direction. For this reason, when the cruise control is operated in the lean vehicle, safety of the lean vehicle is possibly compromised due to the change in the posture of the lean vehicle in the pitch direction in the deceleration process of the lean vehicle.

The present invention addresses the above-described issues. Thus, it is an objective of the present invention to provide a controller and a control method capable of improving safety of a lean vehicle.

As one aspect of the present invention, a controller maneuvers a lean vehicle. The controller includes an execution section. The execution section executes an operation that causes the lean vehicle to execute a cruise control based on a positional relationship information that is information about a positional relationship between the lean vehicle and a preceding vehicle preceding the lean vehicle. While the operation is enabled by a rider of the lean vehicle, the execution section changes a ratio between a braking force generated in a front wheel of the lean vehicle and a braking force generated in a rear wheel based on a speed information of the lean vehicle.

As one aspect of the present invention, a control method for maneuvering a lean vehicle includes executing, using an execution section of a controller, an operation that causes the lean vehicle to execute a cruise control based on a positional relationship information that is information about a positional relationship between the lean vehicle and a preceding vehicle preceding the lean vehicle. While the operation is enabled by a rider of the lean vehicle, the execution section changes a ratio between a braking force generated in a front wheel of the lean vehicle and a braking force generated in a rear wheel based on a speed information of the lean vehicle.

Advantageous Effects of Invention

According to a controller and a control method of the present invention, the execution section of the controller executes an operation that causes the lean vehicle to execute a cruise control based on a positional relationship information that is information about a positional relationship between the lean vehicle and a preceding vehicle preceding the lean vehicle. While the operation is enabled by a rider of the lean vehicle, the execution section changes a ratio between a braking force generated in a front wheel of the lean vehicle and a braking force generated in a rear wheel based on a speed information of the lean vehicle. In this way, it is possible to prevent a change in a posture of the lean vehicle in a pitch direction in a deceleration process of the lean vehicle. Therefore, it is possible to improve safety of the lean vehicle.

BRIEF DESCRIPTION OF THE DRAWINGS

FIG. 1 is a schematic view illustrating an outline configuration of a lean vehicle according to an embodiment of the present invention.

FIG. 2 is a block diagram illustrating an exemplary functional configuration of a controller according to the embodiment of the present invention.

FIG. 3 is a schematic view illustrating an outline configuration of a brake system for the lean vehicle according to the embodiment of the present invention.

FIG. 4 is a flowchart illustrating an example of a processing procedure that is executed by the controller according to the embodiment of the present invention.

DETAILED DESCRIPTION

A description will hereinafter be made on a controller according to the present invention with reference to the drawings.

The following description will be made on the controller that is used for a two-wheeled motorcycle (see a lean vehicle 1 in FIG. 1). However, a vehicle as a control target of the controller according to the present invention only needs to be a lean vehicle and may be a lean vehicle other than the two-wheeled motorcycle. The lean vehicle means a vehicle, a body of which is tilted to the right when turning in a right direction and is tilted to the left when turning in a left direction. Examples of the lean vehicle are motorcycles (the two-wheeled motor vehicle and a three-wheeled motor vehicle) and pedal-driven vehicles. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are an electrically-assisted pedal-driven vehicle and an electric pedal-driven vehicle.

In addition, the engine, more specifically, an engine 11 in FIG. 1 described later, is mounted as a drive source that can output power for driving a wheel according to the following descriptions. However, as the drive source, a drive source other than the engine (for example, an electric motor) may be mounted, or plural drive sources may be mounted.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Lean Vehicle>

A description will be made on a configuration of the lean vehicle 1 according to an embodiment of the present invention with reference to FIG. 1 to FIG. 3.

FIG. 1 is a schematic view illustrating an outline configuration of the lean vehicle 1. FIG. 2 is a block diagram illustrating an exemplary functional configuration of a controller 30.

The lean vehicle 1 is a two-wheeled motorcycle that corresponds to an example of the lean vehicle according to the present invention. As illustrated in FIG. 1 and FIG. 2, the lean vehicle 1 includes a front wheel 2, a rear wheel 3, the engine 11, a transmission 12, a hydraulic pressure control unit 13, a surrounding environment sensor 14, an inertial measurement unit (IMU) 15, a seating sensor 16, a front-wheel rotational frequency sensor 17, a rear-wheel rotational frequency sensor 18, a gear position sensor 19, an accelerator operation section 21, a brake operation section 22, a clutch operation section 23, a transmission operation section 24, and the controller (ECU) 30.

The engine 11 corresponds to an example of a drive source of the lean vehicle 1 and can output the power for driving the wheel. For example, the engine 11 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount to the combustion chamber varies according to a throttle opening amount as an opening amount of the throttle valve.

The transmission 12 is a stepped transmission. That is, the transmission 12 has plural gear stages. An input shaft of the transmission 12 is connected to the crankshaft of the engine 11. An output shaft of the transmission 12 is connected to the rear wheel 3. Accordingly, the power that is output from the engine 11 is transmitted to the transmission 12, is changed by the transmission 12, and is then transmitted to the rear wheel 3 as a drive wheel. The rider can make a shift change by performing a gear shift operation while a clutch that is interposed between the crankshaft of the engine 11 and the input shaft of the transmission 12 is disengaged by a clutch operation.

The hydraulic pressure control unit 13 is a unit that has a function of controlling a braking force to be generated in the wheel. For example, the hydraulic pressure control unit 13 includes components (for example, a control valve and a pump) that are provided to an oil channel connecting a master cylinder and a wheel cylinder and control a brake hydraulic pressure in the wheel cylinder. The braking force to be generated in the wheel is controlled by controlling operation of the components in the hydraulic pressure control unit 13. A detailed description on a brake system that includes the hydraulic pressure control unit 13 will be made below.

The surrounding environment sensor 14 detects surrounding environment information related to environment around the lean vehicle 1. For example, the surrounding environment sensor 14 is provided to a front portion of a trunk of the lean vehicle 1 and detects the surrounding environment information in front of the lean vehicle 1. The surrounding environment information detected by the surrounding environment sensor 14 is output to the controller 30.

The surrounding environment information that is detected by the surrounding environment sensor 14 may be information about a distance to or an orientation of a target object that is located around the lean vehicle 1 (for example, a relative position, a relative distance, a relative speed, relative acceleration, or the like), or may be a characteristic of the target object that is located around the lean vehicle 1 (for example, a type of the target object, a shape of the target object itself, a mark on the target object, or the like). Examples of the surrounding environment sensor 14 are a radar, a Lidar sensor, an ultrasonic sensor, and a camera.

The surrounding environment information can also be detected by a surrounding environment sensor that is mounted to another vehicle or by an infrastructure facility. That is, the controller 30 can also acquire the surrounding environment information via wireless communication with the other vehicle or the infrastructure facility.

The IMU 15 includes a three-axis gyroscope sensor and a three-directional acceleration sensor and detects a posture of the lean vehicle 1. The IMU 15 is provided to the trunk of the lean vehicle 1, for example. For example, the IMU 15 detects a lean angle of the lean vehicle 1 and outputs a detection result. The IMU 15 may detect another physical quantity that can substantially be converted to the lean angle of the lean vehicle 1. The lean angle corresponds to an angle representing a tilt in a rolling direction of a body (more specifically, the trunk) of the lean vehicle 1 with respect to an upper vertical direction. The IMU 15 may only include parts of the three-axis gyroscope sensor and the three-directional acceleration sensor.

The seating sensor 16 is provided to a rear seat of the lean vehicle 1 and detects presence or absence of an occupant or a loaded article on a rear seat. The presence or the absence of the occupant on the rear seat corresponds to an example of occupant information of the lean vehicle 1. Here, the occupant information only needs to be information about the occupant of the lean vehicle 1 and can include the number of the occupant in the lean vehicle 1, weight of each of the occupants, and the like, for example. The presence or the absence of the loaded article on the rear seat corresponds to an example of loaded article information of the lean vehicle 1. Here, the loaded article information only needs to be information about the loaded article of the lean vehicle 1 and can include the number of the loaded article in the lean vehicle 1, weight of each of the loaded articles, and the like, for example. That is, the seating sensor 16 corresponds to an example of a sensor that detects the occupant information and the loaded article information of the lean vehicle 1. However, the occupant information or the loaded article information of the lean vehicle 1 may be detected by a sensor (for example, a camera or the like) other than the seating sensor 16.

The front-wheel rotational frequency sensor 17 is a wheel rotational frequency sensor that detects a rotational frequency of the front wheel 2 (for example, a rotational frequency of the front wheel 2 per unit time [rpm], a travel distance of the front wheel 2 per unit time [km/h], or the like), and outputs a detection result. The front-wheel rotational frequency sensor 17 may detect another physical quantity that can substantially be converted to the rotational frequency of the front wheel 2. The front-wheel rotational frequency sensor 17 is provided to the front wheel 2.

The rear-wheel rotational frequency sensor 18 is a wheel rotational frequency sensor that detects a rotational frequency of the rear wheel 3 (for example, the rotational frequency of the rear wheel 3 per unit time [rpm], a travel distance of the rear wheel 3 per unit time [km/h], or the like), and outputs a detection result. The rear-wheel rotational frequency sensor 18 may detect another physical quantity that can substantially be converted to the rotational frequency of the rear wheel 3. The rear-wheel rotational frequency sensor 18 is provided to the rear wheel 3.

The gear position sensor 19 detects at which gear stage the gear stage of the transmission 12 is set, and outputs a detection result. The gear position sensor 19 is provided to the transmission 12, for example.

The accelerator operation section 21 is an operation section that is used by the rider for an accelerator operation. The accelerator operation is an operation to adjust drive power of the lean vehicle 1. For example, the accelerator operation section 21 is an accelerator grip that is provided to a handlebar of the lean vehicle 1, and the accelerator operation is an operation to rotate the accelerator grip.

The brake operation section 22 is an operation section that is used by the rider for a brake operation. The brake operation is an operation to adjust the braking force of the lean vehicle 1. For example, the brake operation section 22 is a brake lever that is provided to the handlebar of the lean vehicle 1, or a brake pedal that is provided to the trunk thereof. The brake operation is an operation to grip the brake lever or an operation to step on the brake pedal.

The clutch operation section 23 is an operation section that is used by the rider for the clutch operation. The clutch operation is an operation to engage or disengage the clutch that is interposed between the crankshaft of the engine 11 and the input shaft of the transmission 12. For example, the clutch operation section 23 is a clutch lever that is provided to the handlebar of the lean vehicle 1, and the clutch operation is an operation to grip the clutch lever.

The transmission operation section 24 is an operation section that is used by the rider for the gear shift operation. The gear shift operation is an operation to switch the gear stage of the transmission 12. For example, the transmission operation section 24 is a shift lever that is provided to the handlebar of the lean vehicle 1, and the gear shift operation is an operation using the shift lever.

The controller 30 maneuvers, i.e., controls behavior of, the lean vehicle 1. For example, the controller 30 is partially or entirely constructed of a microcomputer, a microprocessor unit, or the like. In addition, the controller 30 may partially or entirely be constructed of one whose firmware and the like can be updated or may partially or entirely be a program module or the like that is executed by a command from a CPU or the like, for example. The controller 30 may be provided as one unit or may be divided into plural units, for example.

As illustrated in FIG. 2, the controller 30 includes an acquisition section 31 and an execution section 32, for example. In addition, the controller 30 communicates with each of the devices in the lean vehicle 1.

The acquisition section 31 acquires information from each of the devices in the lean vehicle 1, and outputs the acquired information to the execution section 32. For example, the acquisition section 31 acquires the information from the surrounding environment sensor 14, the IMU 15, the seating sensor 16, the front-wheel rotational frequency sensor 17, the rear-wheel rotational frequency sensor 18, the gear position sensor 19, the accelerator operation section 21, the brake operation section 22, the clutch operation section 23, and the transmission operation section 24. In the present specification, the acquisition of the information can include extraction, generation, and the like of the information.

The execution section 32 executes various types of control by controlling operation of each of the devices in the lean vehicle 1. For example, the execution section 32 controls the operation of the engine 11, the transmission 12, and the hydraulic pressure control unit 13.

Here, the lean vehicle 1 can select, as a travel mode, a cruise control mode in which the lean vehicle 1 executes cruise control. For example, in response to the rider's input operation using an input device of the lean vehicle 1, the execution section 32 sets the travel mode to the cruise control mode. In the cruise control mode, the execution section 32 automatically controls a speed of the lean vehicle 1 without relying on an accelerating/decelerating operation (that is, the accelerator operation and the brake operation) by the rider. For example, the execution section 32 monitors a value of the speed of the lean vehicle 1 that is acquired based on the rotational frequency of the front wheel 2 and the rotational frequency of the rear wheel 3. As such, the execution section 32 can control the speed of the lean vehicle 1 to a target speed.

In addition, in the cruise control mode, the execution section 32 executes, as normal operation, an operation that causes the lean vehicle 1 to execute the cruise control based on a positional relationship information. The positional relationship information is information about a positional relationship between the lean vehicle 1 and a vehicle ahead of the lean vehicle 1, e.g., information about a relationship between a position of the lean vehicle 1 and a position of the vehicle ahead of the lean vehicle 1. In the normal operation, for example, the execution section 32 determines the target speed based on the positional relationship information and controls the speed of the lean vehicle 1 to the target speed. The target speed that is determined based on the positional relationship information is such a speed at which an inter-vehicular distance between the lean vehicle 1 and the preceding vehicle is secured to be equal to or longer than a reference distance. The reference distance is such a distance with which safety against a collision with the preceding vehicle is sufficiently secured. Such normal operation optimizes the inter-vehicular distance between the lean vehicle 1 and the preceding vehicle.

For example, the positional relationship information can include information about a relative position, a relative distance, a relative speed, a relative acceleration, or relative jerk of the lean vehicle 1 to the preceding vehicle. As such, the positional relationship information can also include a passing time difference between the lean vehicle 1 and the preceding vehicle, or the like. The positional relationship information may be information about another physical quantity that can substantially be converted to one of these types of the information. For example, the positional relationship information can be acquired based on the detection result by the surrounding environment sensor 14.

A description will herein be made on an outline configuration of a brake system 10 in the lean vehicle 1 and control of the braking force generated in the lean vehicle 1 with reference to FIG. 3. FIG. 3 is a schematic view illustrating the outline configuration of the brake system 10 in the lean vehicle 1. As illustrated in FIG. 3, the brake system 10 has, as the brake operation section 22, a first brake operation section 22a and a second brake operation section 22b. The first brake operation section 22a is the brake lever, for example. The second brake operation section 22b is the brake pedal, for example. The brake system 10 includes: a front-wheel brake mechanism 41. The front-wheel brake mechanism 41 brakes the front wheel 2 in an interlocking manner with at least the first brake operation section 22*a*. A rear-wheel brake mechanism 42 brakes the rear wheel 3 in an interlocking manner with at least the second brake operation section 22*b*. The brake system 10 also includes the hydraulic pressure control unit 13, and the front-wheel brake mechanism 41 and the rear-wheel brake mechanism 42 are partially included in the hydraulic pressure control unit 13.

Each of the front-wheel brake mechanism 41 and the rear-wheel brake mechanism 42 includes: a master cylinder 51 in which a piston (not illustrated) is installed; a reservoir 52 that is attached to the master cylinder 51; a brake caliper 53 that is held by the trunk of the lean vehicle 1 and has a brake pad (not illustrated); a wheel cylinder 54 that is provided to the brake caliper 53; a primary channel 55 through which a brake fluid in the master cylinder 51 flows into the wheel cylinder 54; a secondary channel 56 through which the brake fluid in the wheel cylinder 54 is released; and a supply channel 57 through which the brake fluid in the master cylinder 51 is supplied to the secondary channel 56.

An inlet valve (EV) 61 is provided to the primary channel 55. The secondary channel 56 bypasses a portion of the primary channel 55 between the wheel cylinder 54 side and the master cylinder 51 side of the inlet valve 61. The secondary channel 56 is sequentially provided with an outlet valve (AV) 62, an accumulator 63, and a pump 64 from an upstream side. Between an end on the master cylinder 51 side of the primary channel 55 and a portion of the primary channel 55 to which a downstream end of the secondary channel 56 is connected, a first valve (USV) 65 is provided. The supply channel 57 communicates between the master cylinder 51 and a portion on a suction side of the pump 64 in the secondary channel 56. A second valve (HSV) 66 is provided to the supply channel 57.

The inlet valve 61 is an electromagnetic valve that is opened in an unenergized state and is closed in an energized state, for example. The outlet valve 62 is an electromagnetic valve that is closed in an unenergized state and is opened in an energized state, for example. The first valve 65 is an electromagnetic valve that is opened in an unenergized state and is closed in an energized state, for example. The second valve 66 is an electromagnetic valve that is closed in an unenergized state and is opened in an energized state, for example.

The hydraulic pressure control unit 13 includes: components such as the inlet valves 61, the outlet valves 62, the accumulators 63, the pumps 64, the first valves 65, and the second valves 66 used to control a brake hydraulic pressure; and a base body 13*a* to which those components are provided and in which channels constituting the primary channels 55, the secondary channels 56, and the supply channels 57 are formed.

The base body 13*a* may be formed of one member or may be formed of plural members. In addition, when the base body 13*a* is formed of the plural members, the components may separately be provided to the different members.

The operation of the components in the hydraulic pressure control unit 13 is controlled by the execution section 32 of the controller 30. As a result, the braking force generated in the front wheel 2 by the front-wheel brake mechanism 41 and the braking force generated in the rear wheel 3 by the rear-wheel brake mechanism 42 are controlled.

During a normal operation, i.e., when the braking force corresponding to the brake operation by the rider is set to be generated in the wheel, the controller 30 opens the inlet valve 61, closes the outlet valve 62, opens the first valve 65, and closes the second valve 66. When the first brake operation section 22*a* is operated in such a state, in the front-wheel brake mechanism 41, the piston (not illustrated) in the master cylinder 51 is pressed to increase the hydraulic pressure of the brake fluid in the wheel cylinder 54, the brake pad (not illustrated) of the brake caliper 53 is then pressed against a rotor 2*a* of the front wheel 2, and the braking force is thereby generated in the front wheel 2. Meanwhile, when the second brake operation section 22*b* is operated, in the rear-wheel brake mechanism 42, the piston (not illustrated) in the master cylinder 51 is pressed to increase the hydraulic pressure of the brake fluid in the wheel cylinder 54, the brake pad (not illustrated) of the brake caliper 53 is then pressed against a rotor 3*a* of the rear wheel 3, and the braking force is thereby generated in the rear wheel 3.

Here, in the cruise control mode, the execution section 32 controls the braking force generated in the wheel without relying on the brake operation by the rider. For example, the execution section 32 brings the lean vehicle 1 into a state where the inlet valve 61 is opened, the outlet valve 62 is closed, the first valve 65 is closed, and the second valve 66 is opened, and drives the pump 64 in such a state. In this way, the execution section 32 increases the hydraulic pressure of the brake fluid in the wheel cylinder 54 and thereby increases the braking force generated in the wheel. In addition, for example, the execution section 32 brings the lean vehicle 1 into a state where the inlet valve 61 is closed, the outlet valve 62 is opened, the first valve 65 is opened, and the second valve 66 is closed, and drives the pump 64 in such a state. In this way, the execution section 32 reduces the hydraulic pressure of the brake fluid in the wheel cylinder 54 and thereby reduces the braking force generated in the wheel.

Furthermore, the execution section 32 controls the front-wheel brake mechanism 41 and the rear-wheel brake mechanism 42 independently and thereby independently controls the braking force generated in the front wheel 2 and the braking force generated in the rear wheel 3. Thus, the execution section 32 can control a ratio between the braking force generated in the front wheel 2 and the braking force generated in the rear wheel 3.

<Operation of Controller>

A description will be made on operation of the controller 30 according to the embodiment of the present invention with reference to FIG. 4.

As described above, in the cruise control mode, the execution section 32 of the controller 30 executes, as the normal operation, the operation to cause the lean vehicle 1 to execute the cruise control based on the positional relationship information between the lean vehicle 1 and the vehicle ahead of the lean vehicle 1. Here, while the normal operation is enabled by the rider of the lean vehicle 1, the execution section 32 changes the ratio between the braking force generated in the front wheel 2 of the lean vehicle 1 and the braking force generated in the rear wheel 3 based on a speed information that is information about a speed of the lean vehicle 1. In this way, as will be described below, the safety of the lean vehicle 1 can be improved. A description will hereinafter be made on a processing example illustrated in FIG. 4 as an example of processing by the controller 30.

A first operation is an operation that causes the lean vehicle 1 to execute the cruise control based on the positional relationship information. The first operation includes the normal operation. Here, a second operation includes an automatic stop operation which will be described later. The second operation is an operation that automatically stops the lean vehicle 1 regardless of the positional relationship information.

FIG. 4 is a flowchart illustrating an example of a processing procedure that is executed by the controller 30. For example, a control flow illustrated in FIG. 4 is executed when the travel mode is set to the cruise control mode. S101 in FIG. 4 corresponds to initiation of the control flow illustrated in FIG. 4. S111 in FIG. 4 corresponds to termination of the control flow illustrated in FIG. 4. When the control flow illustrated in FIG. 4 is initiated, the normal operation is being executed.

When the control flow illustrated in FIG. 4 is initiated, the execution section 32 determines whether a specified operation is performed by the rider at S102.

When it is determined that the specified operation is not performed by the rider at S102 (S102/NO), S102 is repeated. On the other hand, when it is determined that the specified operation is performed by the rider at S102 (S102/YES), the processing proceeds to S103. At S103, the execution section 32 initiates the automatic stop operation.

The automatic stop operation is the operation that automatically stops the lean vehicle 1 regardless of, i.e., not based on, the positional relationship information between the lean vehicle 1 and the preceding vehicle. More specifically, in the automatic stop operation, the execution section 32 decelerates and stops the lean vehicle 1. Here, in the automatic stop operation, the execution section 32 controls the deceleration, which is generated in the lean vehicle 1, regardless of the positional relationship information.

As described above, the execution section 32 executes the automatic stop operation when the specified operation is performed by the rider. The specified operation can be any of various operations.

As will be described below, in the cruise control mode, it is possible to switch the state of executing the automatic stop operation to the state of executing the normal operation. That is, in the cruise control mode, the normal operation is enabled by the rider. Thus, the execution section 32 executes the automatic stop operation, e.g., when the specified operation is performed by the rider while the normal operation is enabled by the rider.

For example, the specified operation can include an operation using the brake operation section 22 that is used for the brake operation by the rider. An example of the specified operation using the brake operation section 22 is an operation of the brake operation section 22 with an operation amount to such extent that the braking force is substantially and hardly generated in the lean vehicle 1.

For example, the specified operation can include an operation using the accelerator operation section 21 that is used for the accelerator operation by the rider. An example of the specified operation using the accelerator operation section 21 is an operation to rotate the accelerator grip in a clockwise direction as a reverse direction of a counterclockwise direction (that is, a direction in which the drive power 1 is increased) from an unloaded state. generated in the lean vehicle For example, the specified operation can include an operation using the clutch operation section 23 that is used for the clutch operation by the rider. An example of the specified operation using the clutch operation section 23 is an operation to disengage the clutch that is interposed between the crankshaft of the engine 11 and the input shaft of the transmission 12.

For example, the specified operation can include an operation using the transmission operation section 24 that is used for the gear shift operation by the rider. An example of the specified operation using the transmission operation section 24 is a shift down operation to shift down the gear stage of the transmission 12 by one stage.

However, the specified operation is not limited to the above-described examples. For example, the specified operation may be an operation using any of the operation sections but differing from the above-described examples. In addition, for example, the specified operation may be an operation using a different operation section from any of the operation sections. Furthermore, for example, the specified operation may be an operation using a dedicated operation section for executing the automatic stop operation. Moreover, for example, the specified operation may be an operation using the plural operation sections.

In the automatic stop operation, for example, the execution section 32 controls the deceleration, which is generated in the lean vehicle 1, to deceleration, which is set in advance. In this case, the rider can easily predict behaviors of the lean vehicle 1 in the automatic stop operation. Thus, the behaviors of the lean vehicle 1 are likely to be in line with the rider's intention.

Here, in the automatic stop operation, the execution section 32 may change the deceleration, which is generated in the lean vehicle 1, based on any of the various parameters.

For example, in the automatic stop operation, the execution section 32 may change the deceleration, which is generated in the lean vehicle 1, based on travel state information of the preceding vehicle. The travel state information of the preceding vehicle is information about a travel state of the preceding vehicle and can include information about a speed, acceleration, jerk, or the like of the preceding vehicle, for example. For example, the travel state information of the preceding vehicle can be acquired based on the detection result by the surrounding environment sensor 14.

The inter-vehicular distance between the lean vehicle 1 and the preceding vehicle is likely to be reduced according to the travel state of the preceding vehicle. Therefore, in the automatic stop operation, it is possible to prevent the inter-vehicular distance between the lean vehicle 1 and the preceding vehicle from becoming excessively short by changing the deceleration, which is generated in the lean vehicle 1, based on the travel state information of the preceding vehicle. For example, when the speed of the preceding vehicle is excessively low, it is possible to prevent the inter-vehicular distance between the lean vehicle 1 and the preceding vehicle from becoming excessively short by increasing the deceleration that is generated in the lean vehicle 1.

For example, in the automatic stop operation, the execution section 32 may change the deceleration, which is generated in the lean vehicle 1, based on travel posture information of the lean vehicle 1. The travel posture information is information about a travel posture of the lean vehicle 1 and, for example, includes lean angle information that is information about the lean angle of the lean vehicle 1, yaw rate information that is information about a yaw rate of the lean vehicle 1, lateral acceleration information that is information about a lateral acceleration of the lean vehicle 1, or the like. For example, the travel posture information can be acquired from the IMU 15.

A stability degree of the posture of the lean vehicle 1 varies by the travel posture of the lean vehicle 1. Therefore, in the automatic stop operation, it is possible to prevent the posture of the lean vehicle 1 from becoming unstable by changing the deceleration, which is generated in the lean vehicle 1, based on the travel posture information of the lean vehicle 1. In particular, in the automatic stop operation, it is possible to appropriately prevent the lean vehicle 1 from falling over in the rolling direction by changing the deceleration, which is generated in the lean vehicle 1, based on the lean angle information of the lean vehicle 1.

For example, in the automatic stop operation, the execution section 32 may change the deceleration, which is generated in the lean vehicle 1, based on a road surface information. The road surface information is information about a road surface on which the lean vehicle 1 travels. The road surface information includes a gradient information that is information about a degree of a gradient of the road surface, a property information of the road surface that is information about a property of the road surface, or the like, for example. For example, the road surface information can be acquired from the surrounding environment sensor 14. For example, when the camera is used as the surrounding environment sensor 14, an image that is captured by the camera is subjected to image processing. In this way, the road surface information can be acquired.

The stability degree of the posture of the lean vehicle 1 varies by the road surface information. Therefore, in the automatic stop operation, it is possible to prevent the posture of the lean vehicle 1 from becoming unstable by changing the deceleration, which is generated in the lean vehicle 1, based on the road surface information. In particular, in the automatic stop operation, it is possible to appropriately prevent the posture of the lean vehicle 1 from becoming unstable by changing the deceleration, which is generated in the lean vehicle 1, based on the gradient information of the road surface.

In the automatic stop operation, the execution section 32 may change a stop position of the lean vehicle 1 based on the road surface information. For example, the execution section 32 appropriately controls the engine 11 and the hydraulic pressure control unit 13 and can thereby adjust the stop position of the lean vehicle 1 in a front-rear direction. For example, based on the road surface information, the execution section 32 evaluates a degree of danger at the time when the rider's feet touch the road surface at each of plural positions in the front-rear direction on the road surface. Then, the execution section 32 adjusts the stop position of the lean vehicle 1 in a manner to reduce the degree of danger at the stop position of the lean vehicle 1 to be lower than a standard. In this way, it is possible to stabilize a stopped posture of the lean vehicle 1 at a stop. Therefore, it is possible to prevent the lean vehicle 1 and the rider from falling over.

For example, in the automatic stop operation, the execution section 32 may change the deceleration, which is generated in the lean vehicle 1, based on the speed of the lean vehicle 1. The stability degree of the posture of the lean vehicle 1 varies by the speed of the lean vehicle 1. Therefore, in the automatic stop operation, it is possible to prevent the posture of the lean vehicle 1 from becoming unstable by changing the deceleration, which is generated in the lean vehicle 1, based on the speed of the lean vehicle 1. For example, when the speed of the lean vehicle 1 is excessively low (for example, near 0 km/h), the deceleration, which is generated in the lean vehicle 1, is reduced. In this way, it is possible to appropriately prevent the posture of the lean vehicle 1 from becoming unstable.

For example, in the automatic stop operation, the execution section 32 may change the deceleration, which is generated in the lean vehicle 1, based on at least one of the occupant information and the loaded article information of the lean vehicle 1. For example, the occupant information and the loaded article information can be acquired from the seating sensor 16.

The stability degree of the posture of the lean vehicle 1 varies by the occupant information and the loaded article information of the lean vehicle 1. Therefore, in the automatic stop operation, it is possible to prevent the posture of the lean vehicle 1 from becoming unstable by changing the deceleration, which is generated in the lean vehicle 1, based on at least one of the occupant information and the loaded article information of the lean vehicle 1.

In the automatic stop operation, the parameters that are used to change the deceleration generated in the lean vehicle 1 are not limited to the above-described examples. That is, in the automatic stop operation, the execution section 32 may change the deceleration, which is generated in the lean vehicle 1, based on a parameter other than the parameters. In addition, in the automatic stop operation, the execution section 32 may change the deceleration, which is generated in the lean vehicle 1, based on the plural types of the parameters.

Following S103, at S104, the execution section 32 determines whether the speed information of the lean vehicle 1 is information indicating that the lean vehicle 1 travels at a lower speed which is a speed lower than the reference speed.

The speed information may indicate a current speed of the lean vehicle 1 or a future speed of the lean vehicle 1. For example, the current speed can be acquired based on the rotational frequency of the front wheel 2 and the rotational frequency of the rear wheel 3. For example, the future speed can be acquired based on history of the rotational frequency of the front wheel 2 and the rotational frequency of the rear wheel 3. However, the current speed and the future speed may be acquired based on the travel state information of the preceding vehicle.

For example, when the current speed of the lean vehicle 1 is lower than the reference speed, the execution section 32 may determine that the speed information of the lean vehicle 1 is the information while the lean vehicle 1 travels at the lower speed than the reference speed. Alternatively, for example, when it is predicted that the current speed of the lean vehicle 1 is lower than the reference speed and the speed of the lean vehicle 1 becomes lower than the reference speed in the future, the execution section 32 may determine that the speed information of the lean vehicle 1 indicates that the lean vehicle 1 travels at the lower speed than the reference speed.

As will be described below, the execution section 32 increases the distribution ratio of the braking force generated in the rear wheel 3 with the speed information indicating that the lean vehicle 1 travels at the lower speed than the reference speed to be higher than the distribution ratio of the braking force generated in the rear wheel 3 with the speed information indicating that the lean vehicle 1 travels at a higher speed than the reference speed. For example, the reference speed can be set to a speed at which the lean vehicle 1 is in a slow travel state. In this case, when the speed information indicates that the lean vehicle 1 travels at the lower speed than the reference speed, the speed information becomes the information indicating that the lean vehicle 1 is in the slow travel state. Here, the slow travel state can include a state where the lean vehicle 1 continues traveling at a speed at which the lean vehicle 1 can be stopped at any time and a state immediately before a stop in a stopping process.

When the speed information of the lean vehicle 1 is determined not to indicate that the lean vehicle 1 travels at the lower speed than the reference speed at S104 (S104/NO), the processing proceeds to S105. Then, at S105, the execution section 32 controls the ratio between the braking force generated in the front wheel 2 and the braking force generated in the rear wheel 3 to become a first ratio. When the speed information of the lean vehicle 1 is determined to indicate that the lean vehicle 1 travels at the higher speed than the reference speed, it means that it is determined NO at S104.

When the speed information of the lean vehicle 1 is determined to indicate that the lean vehicle 1 travels at the lower speed than the reference speed at S104 (S104/YES), the processing proceeds to S106. Then, at S106, the execution section 32 controls the ratio between the braking force generated in the front wheel 2 and the braking force generated in the rear wheel 3 to become a second ratio.

Here, the distribution ratio of the braking force to the rear wheel 3 when the ratio is the second ratio is higher than the distribution ratio of the braking force to the rear wheel 3 when the ratio is the first ratio. For example, when the ratio is the first ratio, the distribution ratio of the braking force to the front wheel 2 is higher than the distribution ratio of the braking force to the rear wheel 3. On the contrary, when the ratio is the second ratio, the distribution ratio of the braking force to the rear wheel 3 is higher than the distribution ratio of the braking force to the front wheel 2. In this case, when the speed information indicates that the lean vehicle 1 is in the slow travel state, the execution section 32 can increase the distribution ratio of the braking force to the rear wheel 3 to be higher than the distribution ratio of the braking force to the front wheel 2.

As described above, the execution section 32 increases the distribution ratio of the braking force to the rear wheel 3 with the speed information indicating that the lean vehicle 1 travels at the lower speed than the reference speed to be higher than the distribution ratio of the braking force to the rear wheel 3 with the speed information indicating that the lean vehicle 1 travels at the higher speed than the reference speed. Here, when the large braking force is generated in the front wheel 2 in the deceleration process of the lean vehicle 1, a pitching that changes the posture of the lean vehicle 1 in the pitch direction is likely to occur. The pitching is a behavior of the entire lean vehicle 1 that rotates about the front wheel 2 such that a rear portion of the lean vehicle 1 is lifted upward. The pitching is particularly likely to occur when the lean vehicle 1 is in the slow travel state. As described above, when the ratio between the braking force generated in the front wheel 2 of the lean vehicle 1 and the braking force generated in the rear wheel 3 is changed based on the speed information of the lean vehicle 1, it is possible to prevent occurrence of the pitching and thus to improve the safety of the lean vehicle 1.

However, in both cases where the ratio is the first ratio and where the ratio is the second ratio, the distribution ratio of the braking force to the front wheel 2 may be higher than the distribution ratio of the braking force to the rear wheel 3. Alternatively, in both cases where the ratio is the first ratio and where the ratio is the second ratio, the distribution ratio of the braking force to the rear wheel 3 may be higher than the distribution ratio of the braking force to the front wheel 2.

Here, each of the first ratio and the second ratio may be a value that is set in advance but may be a value that is changed based on the various parameters. That is, the execution section 32 may change the ratio between the braking force generated in the front wheel 2 and the braking force generated in the rear wheel 3 based on the various parameters in addition to the speed information.

For example, the execution section 32 may change the ratio between the braking force generated in the front wheel

2 and the braking force generated in the rear wheel 3 based on the road surface information in addition to the speed information. Likeliness of the change in the posture of the lean vehicle 1 in the pitch direction in the deceleration process of the lean vehicle 1 varies by the road surface information. Thus, it is possible to prevent the change in the posture of the lean vehicle 1 in the pitch direction in the deceleration process of the lean vehicle 1 by changing the ratio between the braking force generated in the front wheel 2 and the braking force generated in the rear wheel 3 based on the road surface information in addition to the speed information.

In particular, the likeliness of the change in the posture of the lean vehicle 1 in the pitch direction in the deceleration process of the lean vehicle 1 varies by whether the road surface on which the lean vehicle 1 travels is an uphill road or a downhill road. Therefore, it is possible to appropriately prevent the change in the posture of the lean vehicle 1 in the pitch direction in the deceleration process of the lean vehicle 1 by changing the ratio between the braking force generated in the front wheel 2 and the braking force generated in the rear wheel 3 based on the gradient information of the road surface in addition to the speed information. For example, the distribution ratio of the braking force to the front wheel 2 when the road surface is the downhill road is increased to be higher than the distribution ratio of the braking force to the front wheel 2 when the road surface is the uphill road. In this way, it is possible to appropriately prevent the change in the posture of the lean vehicle 1 in the pitch direction in the deceleration process of the lean vehicle 1.

For example, the execution section 32 may change the ratio between the braking force generated in the front wheel 2 and the braking force generated in the rear wheel 3 based on the travel posture information of the lean vehicle 1 in addition to the speed information. The likeliness of the change in the posture of the lean vehicle 1 in the pitch direction in the deceleration process of the lean vehicle 1 varies by the travel posture of the lean vehicle 1. Thus, it is possible to prevent the change in the posture of the lean vehicle 1 in the pitch direction in the deceleration process of the lean vehicle 1 by changing the ratio between the braking force generated in the front wheel 2 and the braking force generated in the rear wheel 3 based on the travel posture information of the lean vehicle 1 in addition to the speed information.

The parameters that are used to change the ratio between the braking force generated in the front wheel 2 and the braking force generated in the rear wheel 3 are not limited to the above-described examples. That is, the execution section 32 may change the ratio between the braking force generated in the front wheel 2 and the braking force generated in the rear wheel 3 based on a parameter other than the above-described parameters. In addition, the execution section 32 may change the ratio between the braking force generated in the front wheel 2 and the braking force generated in the rear wheel 3 based on the plural types of the parameters in addition to the speed information.

At S107 following S105 or S106, the execution section 32 determines whether an operation state information of the accelerator operation section 21 is information indicating that the accelerator operation section 21 is operated. The operation state information of the accelerator operation section 21 is information about an operation state of the accelerator operation section 21 operated by the rider. For example, the operation state information can be acquired from the accelerator operation section 21.

At S107, when the operation state information of the accelerator operation section 21 is determined to indicate that the accelerator operation section 21 is operated (S107/YES), the processing proceeds to S108. At S108, the execution section 32 executes the normal operation instead of the automatic stop operation, and the processing returns to S102.

As described above, when the operation state information of the accelerator operation section 21 acquired during execution of the automatic stop operation indicates that the accelerator operation section 21 is operated, the execution section 32 executes the normal operation instead of the automatic stop operation. When the accelerator operation section 21 is the accelerator grip, the state where the accelerator operation section 21 is operated is not limited to the state where the operation to rotate the accelerator grip in the counterclockwise direction is performed from the unloaded state. The state where the accelerator operation section 21 is operated can also include the state where the operation to rotate the accelerator grip in the clockwise direction as the reverse direction of the counterclockwise direction is performed from the unloaded state. The counterclockwise direction is, i.e., the direction in which the drive power generated in the lean vehicle 1 is increased.

Here, the automatic stop operation may be switched to the normal operation immediately after it is determined YES at S107 or after certain duration of time elapses from a time point at which it is determined YES at S107. For example, the execution section 32 may switch the automatic stop operation to the normal operation after the speed of the lean vehicle 1 is increased with the accelerator operation and the speed of the lean vehicle 1 reaches the reference speed or the higher speed than the reference speed to some degree.

When the execution section 32 executes the normal operation instead of the automatic stop operation, the execution section 32 may use a setting information. The setting information is information about a setting set by the rider in the normal operation that has been executed before the automatic stop operation is executed. The setting information can include various types of the information that are used in the cruise control mode. For example, the setting information can include an upper limit value of the speed of the lean vehicle 1 in the cruise control mode, various parameters for determining the target speed of the lean vehicle 1, or the like.

At S107, when the operation state information of the accelerator operation section 21 indicates that the accelerator operation section 21 is operated (S107/NO), the processing proceeds to S109. At S109, the execution section 32 determines whether the lean vehicle 1 is stopped.

When it is determined, at S109, that the lean vehicle 1 is not stopped (S109/NO), the processing returns to S104. On the other hand, when it is determined, at S109, that the lean vehicle 1 is stopped (S109/YES), the processing proceeds to S110. At S110, the execution section 32 terminates the automatic stop operation. Then, the control flow illustrated in FIG. 4 is terminated.

After the lean vehicle 1 is stopped by the automatic stop operation, the lean vehicle 1 is supported with the rider's feet touching the road surface. Then, when the rider performs the accelerator operation, i.e., when the operation state information of the accelerator operation section 21 indicates that the accelerator operation section 21 is operated, the execution section 32 restarts and reaccelerates the lean vehicle 1 in response to the accelerator operation. Then, after the speed of the lean vehicle 1 reaches the reference speed or the higher speed than the reference speed to some degree, the execution section 32 executes the normal operation. In this way, the lean vehicle 1 can be stopped and restarted in the cruise control mode without performing an operation to cancel the cruise control mode. When an operation using the operation section other than the accelerator operation section 21 is performed after the lean vehicle 1 is stopped by the automatic stop operation, the execution section 32 may restart the lean vehicle 1.

The description has been made so far on the processing example by the controller 30 with reference to the flowchart in FIG. 4. However, the processing executed by the controller 30 is not limited to the above-described example. For example, as will be described below, a change may be made to a part of the processing that has been described above, or additional processing may be executed for the processing that has been described above.

The description described above has been made on the example in which the ratio between the braking force generated in the front wheel 2 and the braking force generated in the rear wheel 3 is changed based on the speed information during execution of the automatic stop operation. However, when the automatic stop operation is not executed, the execution section 32 may change the ratio between the braking force generated in the front wheel 2 and the braking force generated in the rear wheel 3 based on the speed information.

The description described above has been made on the example in which the ratio between the braking force generated in the front wheel 2 and the braking force generated in the rear wheel 3 is changed in two steps. However, the execution section 32 may change the ratio between the braking force generated in the front wheel 2 and the braking force generated in the rear wheel 3 in three steps or more. Alternatively, the execution section 32 may continuously change the ratio between the braking force generated in the front wheel 2 and the braking force generated in the rear wheel 3 according to the speed of the lean vehicle 1. In any of the cases, the distribution ratio of the braking force to the rear wheel 3 is preferably increased as the speed of the lean vehicle 1 is reduced.

The execution section 32 may execute operation to continue application of the braking force to the lean vehicle 1 after the lean vehicle 1 is stopped by the automatic stop operation. In such operation, the execution section 32 applies the braking force to the lean vehicle 1 without relying on the brake operation by the rider. In this way, the lean vehicle 1 remains at the stop position and is thereby prevented from moving in the front-rear direction.

<Effects of Controller>

A description will be made on effects of the controller 30 according to the embodiment of the present invention.

According to the controller 30, the execution section 32, while the first operation is enabled by the rider of the lean vehicle 1, changes the ratio between the braking force generated in the front wheel 2 of the lean vehicle 1 and the braking force generated in the rear wheel 3 based on the speed information of the lean vehicle 1. The first operation is the operation that causes the lean vehicle 1 to execute the cruise control based on the positional relationship information between the lean vehicle 1 and the preceding vehicle. The first operation may be the normal operation. In this way, it is possible to prevent the change in the posture of the lean vehicle 1 in the pitch direction in the deceleration process of the lean vehicle 1. More specifically, it is possible to prevent occurrence of the pitching, which is caused by the generation of the large braking force on the front wheel 2. Therefore, it is possible to improve the safety of the lean vehicle 1.

Preferably, according to the controller 30, the execution section 32 executes the second operation (e.g., the automatic stop operation) when the specified operation is performed by the rider while the first operation is enabled by the rider of the lean vehicle 1. The second operation is the operation that automatically stops the lean vehicle 1 regardless of the positional relationship information. In this way, when it is attempted to stop the lean vehicle 1 during execution of the cruise control, the lean vehicle 1 can be decelerated in line with the rider's intention. Thus, it is possible to prevent the lean vehicle 1 from falling over by the unintended deceleration. Therefore, it is possible to further appropriately improve the safety of the lean vehicle 1.

Preferably, according to the controller 30, the execution section 32, during the second operation, changes the ratio between the braking force generated in the front wheel 2 and the braking force generated in the rear wheel 3 based on the speed information. In this way, when the lean vehicle 1 is in the slow travel state where the pitching, which is caused by the generation of the large braking force in the front wheel 2, is particularly likely to occur, it is possible to appropriately prevent the change in the posture of the lean vehicle 1 in the pitch direction.

Preferably, according to the controller 30, the execution section 32 executes the first operation instead of the second operation when the operation state information of the accelerator operation section 21 of the lean vehicle 1 acquired during the second operation indicates that the accelerator operation section 21 is operated. As a result, the accelerator operation is performed. In addition, when the speed of the lean vehicle 1 becomes higher than the reference speed, the second operation is appropriately switched to the first operation.

Preferably, according to the controller 30, the execution section 32 uses the setting information when the execution section 32 executes the first operation instead of the second operation. The setting information is the information about the setting set by the rider in the first operation that has been executed before the second operation is executed. As a result, when the first operation is executed after the second operation is executed, it is possible to prevent the rider from feeling a sense of discomfort, which is caused by a change in the behavior of the lean vehicle 1 from the last first operation that has been executed before execution of the second operation.

Preferably, according to the controller 30, the execution section 32 increases the distribution ratio of the braking force to the rear wheel 3 with the speed information indicating that the lean vehicle 1 travels at the lower speed to be higher than the distribution ratio of the braking force to the rear wheel 3 with the speed information indicating that the lean vehicle 1 travels at the higher speed. The lower speed is the speed that is lower than the reference speed. The higher speed is the speed that is higher than the reference speed. In this way, in a situation where the speed of the lean vehicle 1, at which the pitching caused by the generation of the large braking force on the front wheel 2 is particularly likely to occur, is reduced, it is possible to prevent the generation of the large braking force on the front wheel 2 and thus to appropriately prevent the occurrence of the pitching.

Preferably, according to the controller 30, the execution section 32 changes the ratio between the braking force generated in the front wheel 2 and the braking force generated in the rear wheel 3 based on the road surface information in addition to the speed information. In this way, it is possible to further appropriately prevent the change in the posture of the lean vehicle 1 in the pitch direction in the deceleration process of the lean vehicle 1.

Preferably, according to the controller 30, the road surface information includes the gradient information of the road surface. In this way, it is possible to change the ratio between the braking force generated in the front wheel 2 and the braking force generated in the rear wheel 3 based on the gradient information of the road surface in addition to the speed information. Therefore, it is possible to further appropriately prevent the change in the posture of the lean vehicle 1 in the pitch direction in the deceleration process of the lean vehicle 1.

Preferably, according to the controller 30, the execution section 32 changes the ratio between the braking force generated in the front wheel 2 and the braking force generated in the rear wheel 3 based on the travel posture information of the lean vehicle 1 in addition to the speed information. In this way, it is possible to further appropriately prevent the change in the posture of the lean vehicle 1 in the pitch direction in the deceleration process of the lean vehicle 1.

Preferably, according to the controller 30, when the speed information indicates that the lean vehicle 1 is in the slow travel state, the execution section 32 increases the distribution ratio of the braking force to the rear wheel 3 to be higher than the distribution ratio of the braking force to the front wheel 2. In this way, when the lean vehicle 1 is in the slow travel state where the pitching, which is caused by the generation of the large braking force in the front wheel 2, is particularly likely to occur, it is possible to appropriately prevent the occurrence of the pitching.

The present invention is not limited to the embodiment that has been described. For example, only a part of the embodiment may be implemented.

REFERENCE SIGNS LIST

1: Lean vehicle
2: Front wheel
2*a*: Rotor
3: Rear wheel
3*a*: Rotor
10: Brake system
11: Engine
12: Transmission
13: Hydraulic pressure control unit
13*a*: Base body
14: Surrounding environment sensor
15: Inertial measurement unit
16: Seating sensor
17: Front-wheel rotational frequency sensor
18: Rear-wheel rotational frequency sensor
19: Gear position sensor
21: Accelerator operation section
22: Brake operation section
22*a*: First brake operation section
22*b*: Second brake operation section
23: Clutch operation section
24: Gear shift operation section
30: Controller
31: Acquisition section
32: Execution section
41: Front-wheel brake mechanism
42: Rear-wheel brake mechanism 51: Master cylinder
52: Reservoir
53: Brake caliper
54: Wheel cylinder
55: Primary channel
56: Secondary channel
57: Supply channel
61: Inlet valve
62: Outlet valve
63: Accumulator
64: Pump
65: First valve
66: Second valve

The invention claimed is:

1. A controller (30) configured to maneuver a lean vehicle (1), the controller comprising:

an execution section (32) configured to execute an operation that causes the lean vehicle (1) to execute a cruise control based on a positional relationship information that is information about a positional relationship between the lean vehicle (1) and a preceding vehicle preceding the lean vehicle (1), wherein while the operation is enabled by a rider of the lean vehicle (1), the execution section (32) changes a ratio between a braking force generated in a front wheel (2) of the lean vehicle (1) and a braking force generated in a rear wheel (3) based on a speed information of the lean vehicle (1).

2. The controller according to claim 1, wherein the execution section (32) executes a second operation when a specified operation is performed by the rider of the lean vehicle (1) while a first operation is enabled by the rider, the first operation is the operation that causes the lean vehicle (1) to execute the cruise control, the second operation is an operation that automatically stops the lean vehicle (1) regardless of the positional relationship information, and the execution section (32), during the second operation, changes the ratio between the braking force generated in the front wheel (2) and the braking force generated in the rear wheel (3) based on the speed information.

3. The controller according to claim 2, wherein the execution section (32) executes the first operation instead of the second operation when an operation state information acquired during the second operation indicates that an accelerator operation section (21) is operated, the operation state information is information about an operation state of the accelerator operation section (21) of the lean vehicle (1) operated by the rider.

4. The controller according to claim 3, wherein when the execution section (32) executes the first operation instead of the second operation, the execution section (32) uses a setting information, the setting information is information about a setting set by the rider in the first operation that has been executed before the second operation is executed.

5. The controller according to claim 1, wherein the execution section (32) increases a distribution ratio of the braking force to the rear wheel (3) with the speed information indicating that the lean vehicle (1) travels at a lower speed lower to be higher than the distribution ratio of the braking force to the rear wheel (3) with the speed information indicating that the lean vehicle (1) travels at a higher speed, the lower speed is a speed lower than a reference speed, and the higher speed is a speed higher than the reference speed.

6. The controller according to claim 1, wherein the execution section (32) changes the ratio between the braking force generated in the front wheel (2) and the braking force generated in the rear wheel (3) based on a road surface information in addition to the speed information.

7. The controller according to claim 6, wherein the road surface information includes a gradient information that is information about a gradient of a road surface.

8. The controller according to claim 1, wherein the execution section (32) changes the ratio between the braking force generated in the front wheel (2) and the braking force generated in the rear wheel (3) based on a travel posture information of the lean vehicle (1) in addition to the speed information.

9. The controller according to claim 1, wherein when the speed information indicates that the lean vehicle (1) is in a slow travel state, the execution section (32) increases a distribution ratio of the braking force to the rear wheel (3) to be higher than a distribution ratio of the braking force to the front wheel (2).

10. A control method for maneuvering a lean vehicle (1), the control method comprising:

executing, using an execution section (32) of a controller (30), an operation that causes the lean vehicle (1) to execute a cruise control based on a positional relationship information that is information about a positional relationship between the lean vehicle (1) and a preceding vehicle preceding the lean vehicle (1), wherein while the operation is enabled by a rider of the lean vehicle (1), the execution section (32) changes a ratio between a braking force generated in a front wheel (2) of the lean vehicle (1) and a braking force generated in a rear wheel (3) based on a speed information of the lean vehicle (1).

* * * * *